United States Patent [19]

Lentz

[11] 3,807,003
[45] Apr. 30, 1974

[54] CIRCLE BAND CLAMP

[75] Inventor: George L. Lentz, Corona del Mar, Calif.

[73] Assignee: Nardon Manufacturing Company, Inc., Alhambra, Calif.

[22] Filed: Jan. 2, 1973

[21] Appl. No.: 320,067

[52] U.S. Cl. ............................................. 24/279
[51] Int. Cl. ............................................ B65d 63/06
[58] Field of Search .......... 285/253, 254, 366, 367; 24/279–286

[56] References Cited
UNITED STATES PATENTS

| | | | |
|---|---|---|---|
| 1,224,062 | 4/1917 | Boor | 24/27 |
| 1,277,398 | 9/1918 | Elliott | 24/279 |
| 1,529,979 | 3/1925 | Williams | 24/283 |
| 2,726,682 | 12/1955 | Conroy et al. | 285/253 X |
| 3,061,903 | 11/1962 | Jagiel | 24/284 X |
| 3,692,062 | 9/1972 | Dunmire | 24/284 |
| 3,722,041 | 3/1973 | Munse | 24/283 |

*Primary Examiner*—Donald A. Griffin
*Attorney, Agent, or Firm*—Lyon and Lyon

[57] ABSTRACT

A circular clamp for a pipe or the like employs a continuous metal band of substantially uniform cross-section and having greater radial width than axial thickness, the band extending approximately two full turns between its ends. Each end of the band has a radially projecting ear which is welded in position or which is formed integrally with the end of the band. A T-Bolt and nut engages the ears to pull them toward each other to tighten the band. In one form of the invention, the band has an axially offset portion located midway between its ends, the magnitude of the offset portion being substantially equal to the axial thickness of the band.

12 Claims, 12 Drawing Figures

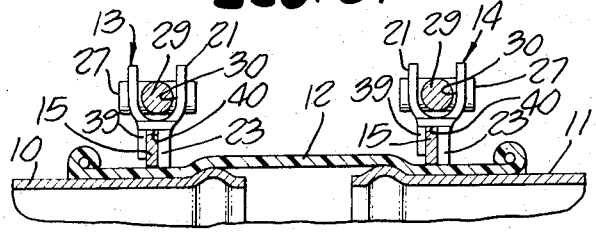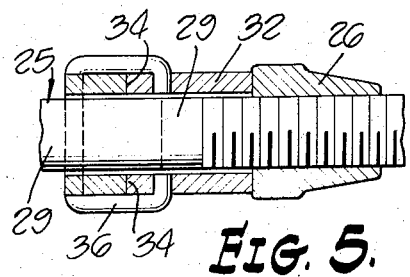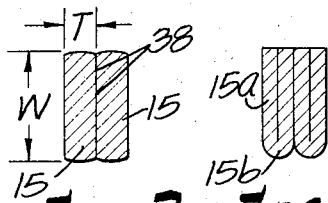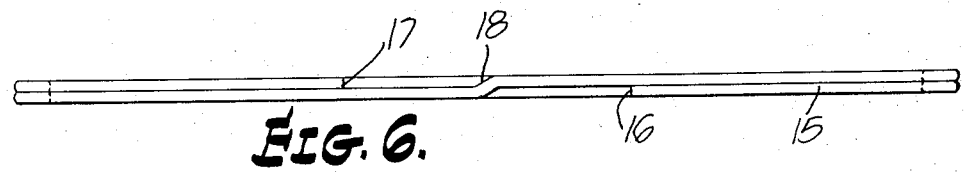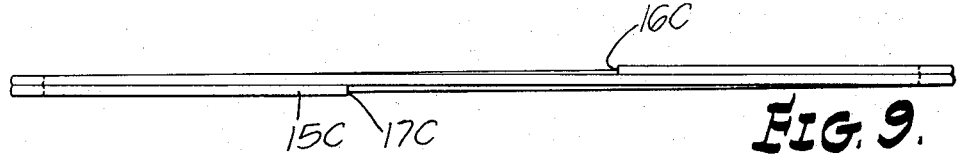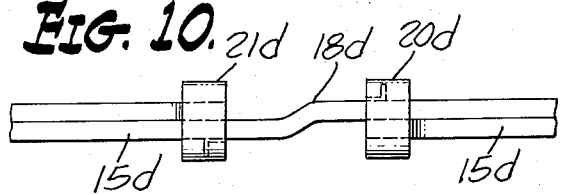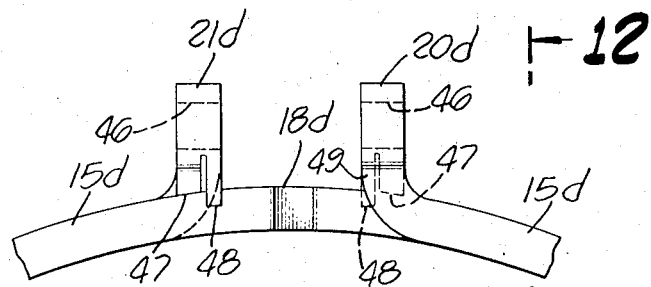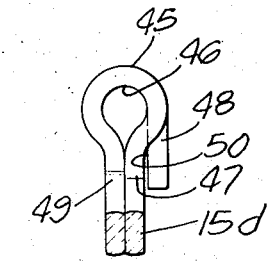

CIRCLE BAND CLAMP

This invention relates to a circle band clamp. The invention will be described in connection with clamps for connecting a pipe coupling to axially aligned pipe ends, but this is by way of illustration, and not by way of limitation. In the conventional type of band clamp, there is a gap between the ends of the band, and even though a tongue may be provided which extends between the ends of the band, the radial compression exerted by the band is not uniform in the region of the gap. This shortcoming makes such conventional clamps unsatisfactory for use with large diameter ducts used on aircraft, which ducts are connected together end-to-end by means of a coupling sleeve and two clamps, because the conventional type band clamps tend to make the pipe ends oblong or egg-shaped.

In other band-type clamps for pipe or hose, the band extends for approximately two full turns but with one turn wrapped upon the other, there being an aperture provided so that one turn may extend through the other. In this form of conventional clamp the radial compression forces are not uniform.

It is an important feature of the present invention to provide a circle clamp which employs a continuous metal band of substantially uniform cross-section and extending for approximately two full turns in side-by-side relationship, so that uniform compression forces are produced on the coupling and pipe ends, and so that the parts do not go out of round.

Other and more detailed objects and advantages will appear hereinafter.

In the drawings:

FIG. 3 is a sectional detail taken substantially on the lines 3—3 as shown in FIG. 1.

FIG. 4 is a sectional detail taken substantially on the lines 4—4 as shown in FIG. 2.

FIG. 5 is a sectional detail taken substantially on the lines 5—5 as shown in FIG. 4.

FIG. 6 is a plan view of the continuous band before the ears are welded to the ends of the band.

FIG. 7 is a view showing the cross-section of adjacent turns of the continuous band.

FIG. 8 is a view similar to FIG. 7, showing a modification.

FIG. 9 is a view similar to FIG. 6, showing a modified form of continuous band.

FIG. 10 is a plan view partly broken away, showing a modified form of circle clamp in which the clamping ears are formed integrally with the ends of the band.

FIG. 11 is a front elevation of the device shown in FIG. 10.

FIG. 12 is a side view taken substantially on the lines 12—12 as shown in FIG. 11.

Figure 1:
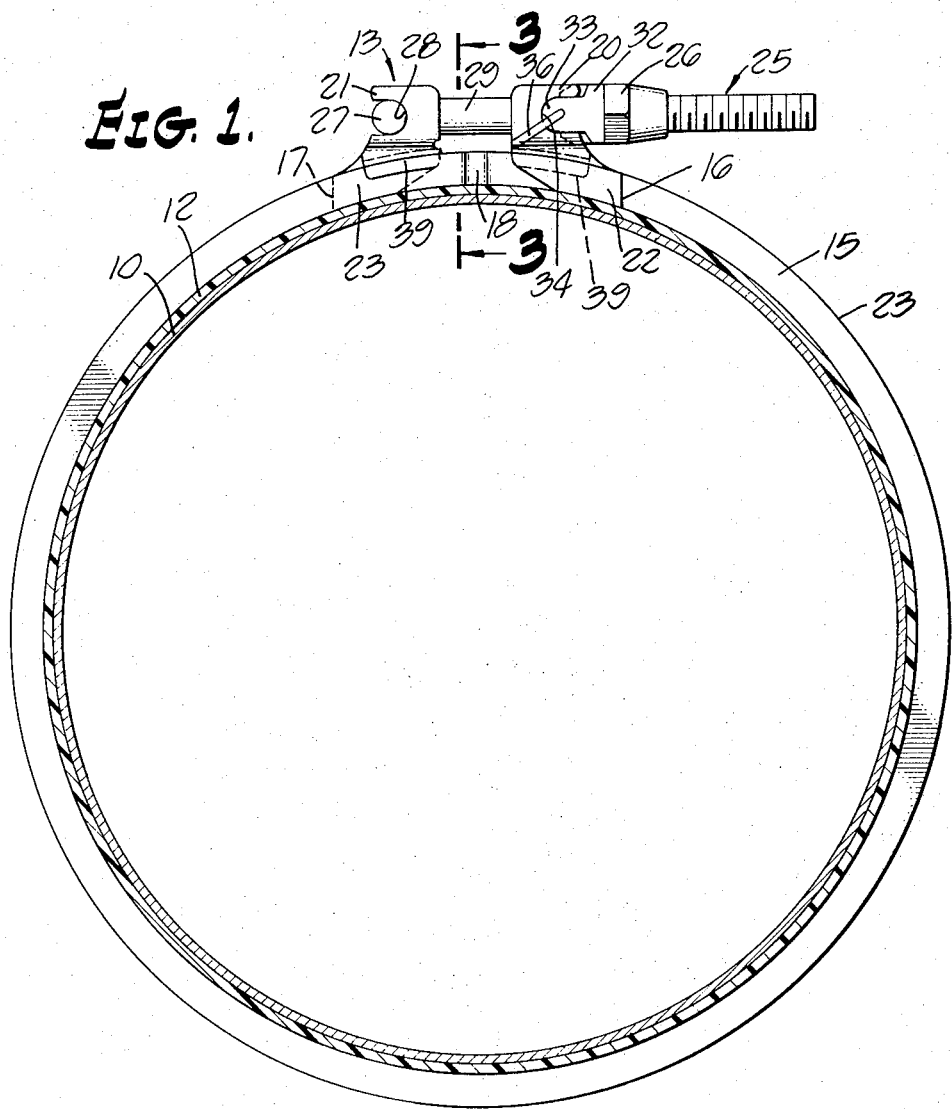
FIG. 1 is an end elevation partly in section, showing a preferred embodiment of this invention.

Referring to the drawings, circular metal pipes 10 and 11 are axially aligned and their end portions are encircled by a non-metallic tubular connector sleeve 12. A circle band clamp assembly 13 encircles the coupling sleeve 12 and pipe 10, and a duplicate circle band clamp assembly 14 encircles the coupling sleeve 12 and pipe 11. Since the assemblies 13 and 14 are duplicates, only one need be described.

The clamp assembly 13 has a continuous metal band 15 which extends for approximately two full turns in side-by-side relationship, between its ends 16 and 17. More specifically, the arcuate length of the continuous band 15 is between one and three-quarters and two full turns. An axially offset portion 18 is positioned midway between the ends 16 and 17 and the magnitude of the offset is substantially equal to the axial thickness of the band 15. The offset 18 lies between the two turns of the continuous band 15.

Clamping ears 20 and 21 are duplicates and each is welded to one of the ends of the band 15. Thus, ear 20 is welded at 16 to the band 15 and ear 21 is welded at 17 to the band 15. Each ear has a short portion 22, 23 which comprises a continuation of the band 15 and each ear projects radially beyond the outer circumference 23 of the band 15. A bolt and nut assembly engages the ears 21 and 20 in order to tension the ends of the continuous metal band 15. Thus, the head 27 of the T-bolt 25 is received in sockets 28 formed on the clamping ear 21, and the shank portion 29 of the T-bolt 25 is received in a recess 30 in the ear 21 and in the recess 31 in the ear 20. A compression piece 32 adjacent the nut 26 encircles the shank 29 of the T-bolt 25 and is provided with convex curved portions 33 which are received within the sockets 34 on the ear 20. A keeper 36 prevents separation of the compression piece 32 and the ear 20.

It will be observed that the recesses 30 and 31 align the shank 29 of the T-bolt 25 so that the axis of the bolt and nut threads lies in a plane defined by the confronting faces 38 (FIG. 7) of the adjacent turns of the continuous band 15. Accordingly, tightening of the nut 26 to tension the T-bolt 25 does not act to cant or warp the ears 20 or 21 or the adjacent end portions of the continuous band 15. As best shown in FIGS. 3 and 4, each of the ears has a finger 39 cooperating with its respective short portion 22, 23 to define a slot 40 for sliding reception of an adjacent portion of the metal band 15. As best shown in FIG. 7, the radial width W of the continuous metal band 15 is greater than its axial thickness T, for maximum strength and stiffness in a radial direction.

In the modified form of the band shown in FIG. 8, the continuous metal band 15a is formed of two layers of metal strip joined at 15b.

Figure 2:
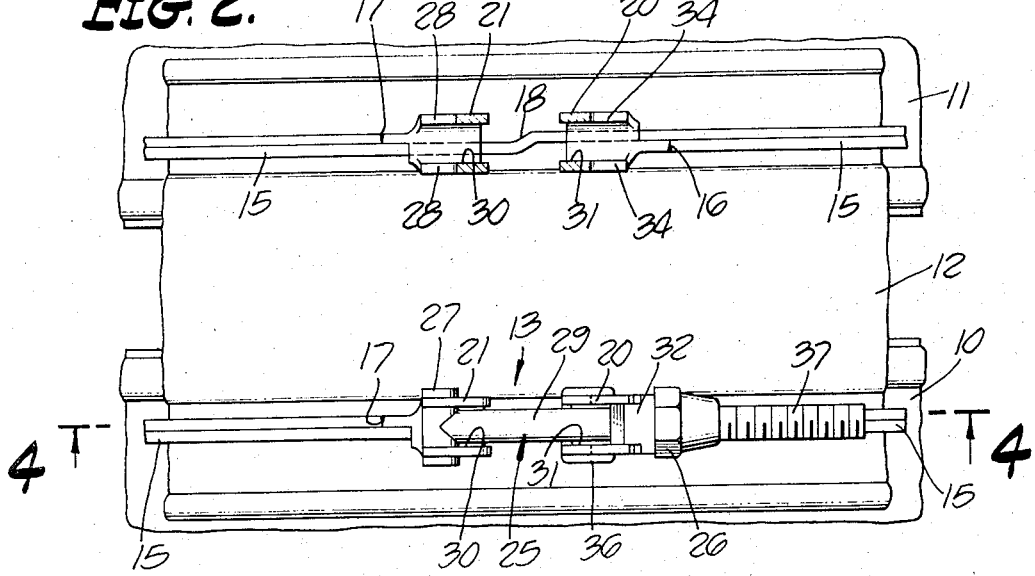
FIG. 2 is a plan view thereof, partly broken away.

In the second modification shown in FIG. 9, the continuous metal band 15c has an axial lead which extends continuously from the end 16c to the other end 17c, rather than a localized axial lead or offset such as the offset 18 as shown in FIG. 6. While the radially extending ears are omitted in FIG. 9, it will be understood that they may be of the type described above and shown in FIGS. 1–7, or of the type described below in connection with the modification shown in FIGS. 10–12.

In the latter form of the invention, the continuous metal band 15d is similar to the continuous metal band 15 described in connection with FIGS. 1–7, including the offset portion 18c. However, the radially extending ears 20d and 21d are formed integrally with the ends of the continuous metal band 15d rather than being welded to the ends of the band. In this form of the invention, the metal at each end of the band is formed to extend radially outward and to provide a loop 45 defining a central opening 46. The terminal end of the loop is shown at 47 and a finger 48 extends from the loop portion to a location below the terminal end 47. The finger 48 cooperates with the portion 49 to define a groove 50 which has sliding contact with an adjacent portion of the metal band 15d. A bolt and nut assembly, not shown, extends through the aligned openings 46 to pull the ears 21d and 20d toward each other to tighten the band.

Having fully described my invention, it is to be understood that I am not to be limited to the details herein set forth but that my invention is of the full scope of the appended claims.

I claim:

1. A circular clamp, comprising in combination: a continuous circular flat metal band of substantially uniform cross-section extending approximately two full turns between its ends, the band having radially inward and radially outwardly directed edges and essentially flat side walls; the band having an axial lead and the convolutions of the band being disposed with their side walls in essentially mutual contact, a radially projecting ear on each end of the band, and means engaging said ears to tighten the band.

2. The combination set forth in claim 1 in which the axial lead of the band occurs at a location between said ears.

3. The combination set forth in claim 1 in which the axial lead of the band occurs throughout the arcuate length of the band.

4. The combination set forth in claim 1 in which each of said ears is channel shaped, is welded to one end of the band and includes a tab overlying the adjacent convolution of the band to hold the convolutions of the band in mutual contact.

5. The combination set forth in claim 1 in which each of siad ears is integral with a corresponding end of the band, includes a radially outwardly directed portion and a radially inwardly directed portion forming therebetween a loop disposed essentially in the plane of the band to receive said tightening means.

6. The combination set forth in claim 1 in which the ear-engaging means comprises a T-bolt and a nut.

7. A circular clamp comprising a continuous metal band of substantially uniform cross-section having greater radial width than axial thickness, said band extending approximately two full turns between its ends, a radially projecting ear on each end of the band, the band having an axially offset portion located between the ends of the band, the magnitude of the offset being substantially equal to the said axial thickness of the band.

8. The combination set forth in claim 7 in which each ear has a side groove slidably receiving an adjacent portion of the band.

9. The combination set forth in claim 7 in which said ears are welded to the ends of the band.

10. The combination set forth in claim 7 in which said ears are formed integrally with the ends of the band.

11. The combination set forth in claim 7 in which threaded means are provided for pulling the ears toward each other, the thread means having an axis contained in a radial plane passing between the two turns of the band.

12. The combination set forth in claim 11 in which the threaded means includes a T-bolt and a nut.

* * * * *